United States Patent
Starzmann

(10) Patent No.: US 6,723,254 B1
(45) Date of Patent: Apr. 20, 2004

(54) FROST RESISTANT HEATING/COOLING FLUID

(75) Inventor: Martin Starzmann, Göteborg (SE)

(73) Assignee: Temper Technology AB, Hindas (CH)

( * ) Notice: Subject to any disclaimer, the term of this patent is extended or adjusted under 35 U.S.C. 154(b) by 0 days.

(21) Appl. No.: 09/463,598

(22) PCT Filed: Jan. 22, 1999

(86) PCT No.: PCT/SE99/00086

§ 371 (c)(1),
(2), (4) Date: Jan. 27, 2000

(87) PCT Pub. No.: WO99/37733

PCT Pub. Date: Jul. 29, 1999

(30) Foreign Application Priority Data

Jan. 22, 1998 (SE) .............................. 9800152

(51) Int. Cl.⁷ ................................ C09K 5/00
(52) U.S. Cl. ............. 252/71; 252/70; 252/73; 252/76; 252/570
(58) Field of Search ............. 252/71, 70, 570

(56) References Cited

U.S. PATENT DOCUMENTS

| | | | | | |
|---|---|---|---|---|---|
| 4,689,165 | A | * | 8/1987 | Kardos et al. ............ | 252/75 |
| 4,717,495 | A | | 1/1988 | Hercamp et al. | |
| 5,132,035 | A | * | 7/1992 | Hoenke et al. ............ | 252/70 |
| 5,242,621 | A | * | 9/1993 | Miller et al. ............ | 252/396 |
| 5,702,631 | A | * | 12/1997 | Conville et al. ............ | 252/76 |
| 5,708,068 | A | * | 1/1998 | Caeder et al. ............ | 524/375 |
| 5,730,895 | A | * | 3/1998 | Moore ............ | 252/70 |
| 5,863,973 | A | * | 1/1999 | Carder et al. ............ | 524/388 |
| 5,993,684 | A | * | 11/1999 | Back et al. ............ | 252/70 |
| 6,126,852 | A | * | 10/2000 | Turcotte et al. ............ | 252/396 |
| 6,156,226 | A | * | 12/2000 | Klyosov et al. ............ | 252/70 |

* cited by examiner

*Primary Examiner*—Yogendra Gupta
*Assistant Examiner*—D G Hamlin
(74) *Attorney, Agent, or Firm*—D. Peter Hochberg; Sean Mellino; Kathering R. Vieyra

(57) ABSTRACT

Frost resistant, aqueous cooling/heating fluid containing alkali salts of acetic acid and/or formic acid and which as a corrosion inhibitor contains a mixture of a $C_5$–$C_{16}$ monocarboxylic acid or alkali-, ammonium- or amino-salts of said acid, a $C_5$–$C_{16}$ dicarboxylic acid or alkali-, ammonium- or amino-salts of said acid, and also a triazole.

10 Claims, No Drawings

FROST RESISTANT HEATING/COOLING FLUID

TECHNICAL FIELD

The present invention relates to a frost resistant, aqueous heating/cooling fluid, containing alkali salts of acetic acid and/or formic acid. The heating/cooling fluid is intended for transport of cold or heat in industrial cooling plants, cooling systems in vessels and vehicles, cooling systems for skating ice in sports centres, heat exchangers, district heating systems, heat pumps, solar panels etc.

BACKGROUND OF THE INVENTION

In aqueous heating/cooling fluids, frost resistance is usually obtained by means of an addition of ethylene glycol. Ethylene glycol is a liquid which is mixable with water to any extent, exhibits a low risk of fire and explosion, and is frost resistant and also colourless and odourless. The lowest solidifying point (−57° C.) of a glycol-water mixture is at a ethylene glycol content of 60 volume-%. However, the disadvantage with ethylene glycol is its high degree of toxicity. Thereby, it poses an environmental threat if it ends up in the sea, lakes and streams, for instance, if cooling liquid is discharged or leaks out.

From EP-B-0 306 972, a partially or completely glycol-free, aqueous cooling fluid is known, which contains an addition of sodium acetate and sodium formate or potassium acetate and potassium formate in certain ratios. By means of this fluid composition, a freezing temperature pf −70° C. or lower can be obtained. The fluid composition exhibits all the advantages with the conventional glycol-water mixture, at the same time as it does not exhibit its toxicity.

However, the above-mentioned cooling fluid contains strong ions, wherein it is very important to have a good corrosion protection. In EP-B-0 306 972, it is disclosed that benzoic acid, sodium benzoate, potassium benzoate or benzotriazole are used for corrosion protection. These are film-forming chemicals. The formed film protects metal surfaces from corrosion attacks. In order not to risk local corrosion attacks, the film layer has to be intact across the entire metal surface. A disadvantage with the film is an impaired heat transfer between the metal surface and the cooling fluid.

PURPOSE OF THE INVENTION AND MOST IMPORTANT FEATURES

The purpose of the present invention is to provide a corrosion protected heating/cooling fluid of the above-mentioned type, which exhibits an effective heat transfer between metal surface and fluid, at the same time as the corrosion protection is excellent. This has been achieved by means of the fluid containing a corrosion inhibitor in the form of a mixture of a $C_5$–$C_{16}$ monocarboxylic acid or alkali-, ammonium- or amino-salts of said acid, a $C_5$–$C_{16}$ dicarboxylic acid or alkali-, ammonium- or amino-salts of said acid, and also a triazole. The foregoing fluid provided by the invention is free of glycol as are inventive compositions described below and included the examples.

The content of alkali salts of acetic acid and/or formic acid in the heating/cooling fluid should preferably be between 5 and 50 weight-%, calculated on the total weight of the fluid.

The heating/cooling fluid contains between 0.4 and 10 weight-%, preferably between 0.5 and 2 weight-% of the above-mentioned corrosion inhibitor, calculated on the weight of the fluid.

SUMMARY OF THE INVENTION

From the above-mentioned EP-B-0 306 972, it is known that an addition of alkali salts of certain anions, mainly acetates and formates, to water results in a strong depression of freezing-point of an aqueous medium. The depression of freezing-point becomes particularly large at certain mixing ratios of the included salts.

The heating/cooling fluid according to the invention contains between 5 and 50 weight-% alkali salts of acetic acid and/or formic acid calculated on the weight of the fluid, primarily sodium acetate, potassium acetate, sodium formate and/or potassium formate. The included salts can be present in any mutual mixing ratio, i.e. only one of the salts or two or several salts in a mixture together. Partly depending on the total salt content, and partly on the mixing ratio of the salts, different depressions of freezing-point of the fluid is obtained. Also other freezing-point depressing additions can be included in the fluid, e.g. urea.

The heating/cooling fluid according to the invention is a strong ionic solution, wherein the significance of an efficient corrosion protection is particulary large. EP-B-0 306 972 discloses an addition of a corrosion inhibitor in the form of benzoic acid, sodium benzoate, potassium benzoate or benzotriazole, which are film-forming chemicals which create a protective film on metals surfaces and thereby protects them from corrosion attacks. As mentioned above, the disadvantages with this type of corrosion inhibitors is partly that the film layer must be intact across the entire metal surface in order to make the corrosion protection effective and to avoid local corrosion attacks, and partly that the heat transfer between metal surface and heating/cooling fluid is impaired.

According to the invention, it has now surprisingly been found that, in addition to an excellent corrosion protection, an addition of a corrosion inhibitor in the form of a mixture of a $C_5$–$C_{16}$ monocarboxylic acid or alkali-, ammonium- or amino-salts of said acid, and also a triazole, furthermore provides an excellent heat transfer between the metal surface and the fluid.

A corrosion inhibitor of this type is disclosed in U.S. Pat. No. 4,647,392. According to this document, the corrosion inhibitor is intended to be used in glycol-water mixtures. The use as a corrosion inhibitor in salt solutions of the type which the invention relates to, however, is not disclosed in the U.S. patent.

The amounts of the components included in the corrosion inhibitor can vary between 0.02 and 3 weight-%, calculated on the weight of the fluid, for both the monocarboxylic acid and the dicarboxylic acid or the alkali-, ammonium-, or amino-salts of said acid. The amount of triazole can vary between 0.02 and 2 weight-%, calculated on the total weight of the fluid.

The total content of the corrosion inhibitor should be between 0.4 and 10 weight-%, preferably between 0.5 and 2 weight-%, calculated on the weight of the fluid.

The corrosion inhibitor comprises a mixture of three basic components, namely a monocarboxylic acid, a dicarboxylic acid and a triazole. The monocarboxylic acid is preferably an aliphatic $C_5$–$C_{16}$ monocarboxylic acid, preferably selected from the group of octanoic acid, nonaic acid, decanoic acid, undecanoic acid or dodecanoic acid, 2-ethyl hexanoic acid and neodecanoic acid.

The dicarboxylic acid is preferably either a $C_8$–$C_{12}$ aliphatic dicarboxylic acid selected from the group of suberic acid, azealic acid, sebacic acid, undecanoic di-acid, dodecanoic di-acid and the di-acid of di-cyclopentadienylide or a $C_8$–$C_{12}$ aromatic dicarboxylic acid, preferably terephthalic acid.

The triazole is preferably tolyoltriazole or benzotriazole.

In comparison with using only one of the acid types, the combination of mono- and dicarboxylic acid or its salts provides a synergistic effect when the corrosion protection of metallic surfaces is concerned. The triazole is specifically used as a cupper protection.

Other conventional corrosion-inhibiting components can of course also be included in the heating/cooling fluid according to the invention.

EXAMPLE

In order to test the heat transfer characteristics, a system in which the liquid which is to be tested is circulating with a constant volume flow under constant pressure was used. This liquid passes a metal coupon onto which a heating device is applied. The temperature of the liquid is kept constant by means of a cooling coil. The temperature of the metal coupon is measured and recorded over time. An increase of the temperature in the metal coupon indicates a relative impairment of the heat transfer ability over the same time.

The liquids which were tested exhibited the following compositions:

| INCLUDED COMPONENTS (weight %) | Reference - Cooling fluid with conventional inhibitor | Test - Cooling fluid with inhibitor according to the invention |
|---|---|---|
| Water | 49.8 | 60 |
| Potassium acetate | 31.2 | 31.2 |
| Potassium formate | 7.8 | 7.8 |
| Sodium benzoate | 1.1 | — |
| Tolyoltriazole | 1.7 | — |
| Borax | 0.3 | — |
| Sodium meta-phosphate | 1 | — |
| Sodium nitrate | 1.8 | — |
| Sodium silicate | 0.3 | — |
| Glycerol | 5 | — |
| Corrosion inhibitor acc. to the invention | — | 1 |

The following results were obtained for the heat transfer characteristics:

| Test duration (h) | TEST Coupon temperature (° C.) | TEST Coupon temperature (° C.) |
|---|---|---|
| 0 | 170 | 170 |
| 10 | 181 | 171 |
| 20 | 183 | 171 |
| 30 | 184 | 171.5 |
| 40 | 186 | 171 |
| 45 | 188 | 171.5 |

As is evident from these results, the test liquid, which comprised an addition of a corrosion inhibitor according to the invention, gave a very small increase of the temperature in the metal coupon over time, something which indicates a maintained effective heat transfer between the metal surface and the fluid. The reference, however, which contained a conventional corrosion inhibitor essentially in accordance with EP 306,972, exhibited a significant increase of the temperature in the metal coupon in the course of time and, accordingly, a relative impairment of the heat transfer ability in the same time period.

This difference is thought to be the result of the corrosion inhibitor in the reference fluid forming a film between fluid and metal surface, which impairs the heat transfer. It is presumed that such a film formation, however, does not take place when utilizing the corrosion inhibitor according to the invention.

What is claimed is:

1. A frost resistant heating or cooling fluid containing alkali salts of acetic acid or formic acid, wherein the fluid is glycol free and further contains a corrosion inhibitor of between 0.4 and 10 weight-% of the total weight of the cooling fluid, said corrosion inhibitor consisting of a mixture selected from the group of $C_5$–$C_{16}$ monocarboxylic acid; alkali-salt, ammonium-salt, and amino-salts of $C_5$–$C_{16}$ monocarboxylic acid; $C_5$–$C_{16}$ dicarboxylic acid, alkali-salt, ammonium-salt and amino-salts of $C_5$–$C_{16}$ dicarboxylic acid; and between 0.02 and 2 weight-% of triazole based on the total weight of the cooling fluid, and the fluid further contains between 5 and 50 weight-% of alkali salts of an acid selected from the group consisting of acetic acid and formic acid based on the weight of the fluid.

2. A frost resistant heating or cooling fluid containing alkali salts of acetic acid or formic acid, wherein the fluid is glycol free, and contains between 0.4 and 10 weight-% of a corrosion inhibitor selected from the group consisting of $C_5$–$C_{16}$ monocarboxylic acid; alkali-salt, ammonium-salt, and amino-salts of $C_5$–$C_{16}$ monocarboxylic acid; $C_5$–$C_{16}$ dicarboxylic acid; alkali-salt, ammonium-salt and amino-salt of said acid, wherein said fluid contains between 0.02 and 3 weight-% of monocarboxylic acid or alkali; ammonium or amino salt of said acid, and said fluid further contains between 0.02 and 3 weight-% of said dicarboxylic acid or alkali, ammonium- or amino salt of said acid, calculated on the total weight of the cooling fluid, and between 0.02 and 2 weight-% of triazole based on the total weight of the cooling fluid, and the fluid further contains between 5 and 50 weight-% of alkali salts of an acid selected from the group consisting of acetic acid and formic acid based on the weight of the fluid.

3. A fluid according to claim 1, wherein said monocarboxylic acid is an aliphatic C5–C16 monocarboxylic acid, selected from the group of octanoic acid, nonaic acid, decanoic acid, undecanoic acid, dodecanoic acid, 2-ethyl hexanoic acid and neodecanoic acid.

4. A fluid according to claim 1, wherein said dicarboxylic acid is a $C_{8-C12}$ aliphatic dicarboxylic acid selected from the group of suberic acid, azealic acid, sebacic acid, undecanoic di-acid, dodecanoic di-acid and the di-acid of di-cyclopentadienylide.

5. A fluid according to claim 1, wherein said dicarboxylic acid is a $C_8$–$C_{12}$ aromatic dicarboxylic acid.

6. A fluid according to claim 1, wherein the triazole is selected from the group consisting of tolyoltriazole and benzotriazole.

7. A fluid according to claim 5 wherein said C8–C12 aromatic dicarboxylic acid is terephthalic acid.

8. A fluid according to claim 1, wherein the alkali salts of acetic acid for formic acid are selected from the group consisting of sodium acetate, potassium acetate, sodium formate and potassium formate.

9. A fluid according to claim 1, wherein the fluid further contains urea.

10. A frost resistant heating or cooling fluid containing alkali salts of acetic acid for formic acid, wherein the fluid is glycol free, and contains a corrosion inhibitor selected from the group consisting of $C_5$–$C_{16}$ monocarboxylic acid; alkali-salt, ammonium-salt, and amino-salts of $C_5$–$C_{16}$ monocarboxylic acid; $C_5$–$C_{16}$ dicarboxylic acid; alkali-salt, ammonium-salt and amino-salts of said acid, wherein said fluid contains between 0.02 and 3 weight-% of monocarboxylic acid or alkali; ammonium or amino salt of said acid, and said fluid further contains between 0.02 and 3 weight-% of said dicarboxylic acid or alkali, ammonium- or amino salt of said acid, calculated on the total weight of the cooling fluid, and between 0.02 and 2 weight-% of triazole based on the total weight of the cooling fluid, and the fluid further contains between 5 and 50 weight-% of alkali salts of an acid selected from the group consisting of acetic and formic acid based on the weight of the fluid.

* * * * *